United States Patent [19]

Stiepel et al.

[11] Patent Number: 4,984,089
[45] Date of Patent: Jan. 8, 1991

[54] OUTDOOR SURVEILLANCE DOME WITH ENHANCED ENVIRONMENTAL APTITUDE AND CONTROL SYSTEM THEREFOR

[75] Inventors: Norbert M. Stiepel, Coral Springs; Edwin Thompson, Loxahatchee; Luis Anderson, Boca Raton, all of Fla.

[73] Assignee: Sensormatic Electronics Corporation, Deerfield Beach, Fla.

[21] Appl. No.: 462,007

[22] Filed: Jan. 8, 1990

[51] Int. Cl.$^5$ .............................................. H04N 7/18
[52] U.S. Cl. .................................. 358/229; 358/108; 354/81; 165/48.1
[58] Field of Search ................. 358/108, 100, 99, 109, 358/209, 229; 354/81, 76, 293; 361/384; 165/48.1

[56] References Cited

U.S. PATENT DOCUMENTS

| | | | |
|---|---|---|---|
| 4,320,949 | 3/1982 | Pagano | 358/108 X |
| 4,414,576 | 11/1983 | Randmae | 358/229 |
| 4,485,407 | 11/1984 | Böhm et al. | 358/229 |
| 4,796,039 | 1/1989 | Pagano | 358/108 X |

Primary Examiner—Victor R. Kostak
Attorney, Agent, or Firm—Robin, Blecker, Daley & Driscoll

[57] ABSTRACT

Outdoor surveillance apparatus, of the type having a camera assembly supported for movement therein, includes a heater supported with the camera assembly for movement therewith, a circulation fan supported with the camera assembly for movement therewith and for issuing output thereof onto the heater, and exhaust fans supported in the apparatus. A thermostat unit generates first (low dome temperature) and second (high dome temperature) output signals and a controller operates the circulation fan continuously during use of the apparatus, operates the heater upon occurrence of the thermostat first output signal, and operates the exhaust fans upon occurrence of the thermostat second output signal.

16 Claims, 5 Drawing Sheets

OUTDOOR SURVEILLANCE DOME WITH ENHANCED ENVIRONMENTAL APTITUDE AND CONTROL SYSTEM THEREFOR

FIELD OF THE INVENTION

This invention relates generally to outdoor surveillance systems and apparatus and pertains more particularly to improved such systems and apparatus, particularly in adaptation thereof to the rigors of ambient environmental influences.

BACKGROUND OF THE INVENTION

Surveillance systems are known wherein a camera is mounted within a dome-shaped housing assembly comprised of an upper housing of generally hemispherical configuration with a "bubble" of like configuration releasably joined to the upper housing and comprised of material permitting the camera to view the surveillance zone therethrough. The camera is mounted for panning, i.e., rotation about a vertical axis, and for tilting motion relative to the horizontal. Coutta U.S. Pat. No. 3,935,380, which issued on Jan. 27, 1976, depicts such apparatus for indoor use, as in monitoring a supermarket cash register for fraudulent transactions involving a clerk and/or customer. An improved such indoor surveillance system and apparatus is shown in Paff et al. U.S. Pat. No. 4,833,534 which issued on May 23, 1989. Both of the '380 and '534 patents are commonly-assigned herewith and incorporating reference is made thereto.

The surveillance dome of the '380 patent is not specifically adapted for operation in environments undergoing extremes in temperature. On the other hand, the prior art has seen outdoor dome structure for surveillance use in which some effort is made to accomodate temperature variations. Thus, Pagano U.S Pat. No. 4,320,949 depicts an outdoor surveillance dome, including high and low temperature sensing capability and hence calling into operation respective cooling and heating apparatus. Thermostats operate an air circulation fan on high temperature sensing, moving ambient air into the dome, or operates an electrical heater on low temperature sensing However it appears that the '949 arrangement provides for continuous flow communication with ambient environment, whether the apparatus is in heating mode or in cooling mode. Further the heaters of the '949 arrangement are fixedly disposed therein and the fan is thermostatically dependent in operation. From applicants' viewpoint, the prior art outdoor surveillance dome apparatus heretofore known does not meet the current demands of performance in the environments in which use is required.

SUMMARY OF THE INVENTION

The present invention has for its primary object the provision of improved outdoor surveillance dome apparatus and systems.

It is a more particular object of the invention to provide enhanced environmental control apparatus and systems for outdoor surveillance domes.

In attaining the foregoing and other objects, the invention provides, in broad sense, a separate involvement of the apparatus thereof with ambient environment in respective heating and cooling modes. To this end, the aparatus is provided with isolation from the ambient environment in its heating mode and communication with the ambient environment in its cooling mode.

More particularly, the invention provides, in combination, in outdoor surveillance apparatus of the type having a camera assembly supported for movement therein, a heater supported with the camera assembly for movement therewith, a circulation fan supported with the camera assembly for movement therewith and for issuing output thereof onto the heater, and an exhaust fan supported in the apparatus.

A thermostat unit generates first and second output signals indicative of respective first (low) and second (high) temperatures in the apparatus and a controller arrangement operates the circulation fan continuously during use of the apparatus, operates the heater upon occurrence of the thermostat unit first output signal, and operates the exhaust fan upon occurrence of the thermostat unit second output signal.

Otherwise viewed, the invention provides a control system for adapting an outdoor surveillance apparatus to environmental conditions, the outdoor surveillance apparatus being of the type having first and second dome-shaped housing assemblies joinable to configure the apparatus in generally spherical form, a camera assembly being supported for movement in the second housing assembly.

The first housing assembly includes the intake valve and the exhaust valve. The intake valve is normally closed and is operatively responsive to negative pressure in the apparatus created by operation of the exhaust fan to provide for flow communication from the environment into the apparatus. The exhaust valve is also normally closed and is opened by issuance of forced air by the exhaust fan. The intake valve has a filter associated therewith.

The foregoing and other objects and features of the invention will be further understood from the following detailed description of preferred embodiments thereof and from the drawings wherein like reference numerals are used to identify like components and parts throughout. dr

DETAILED DESCRIPTION OF THE PREFERRED EMBODIMENT AND PRACTICE

Figure 1:
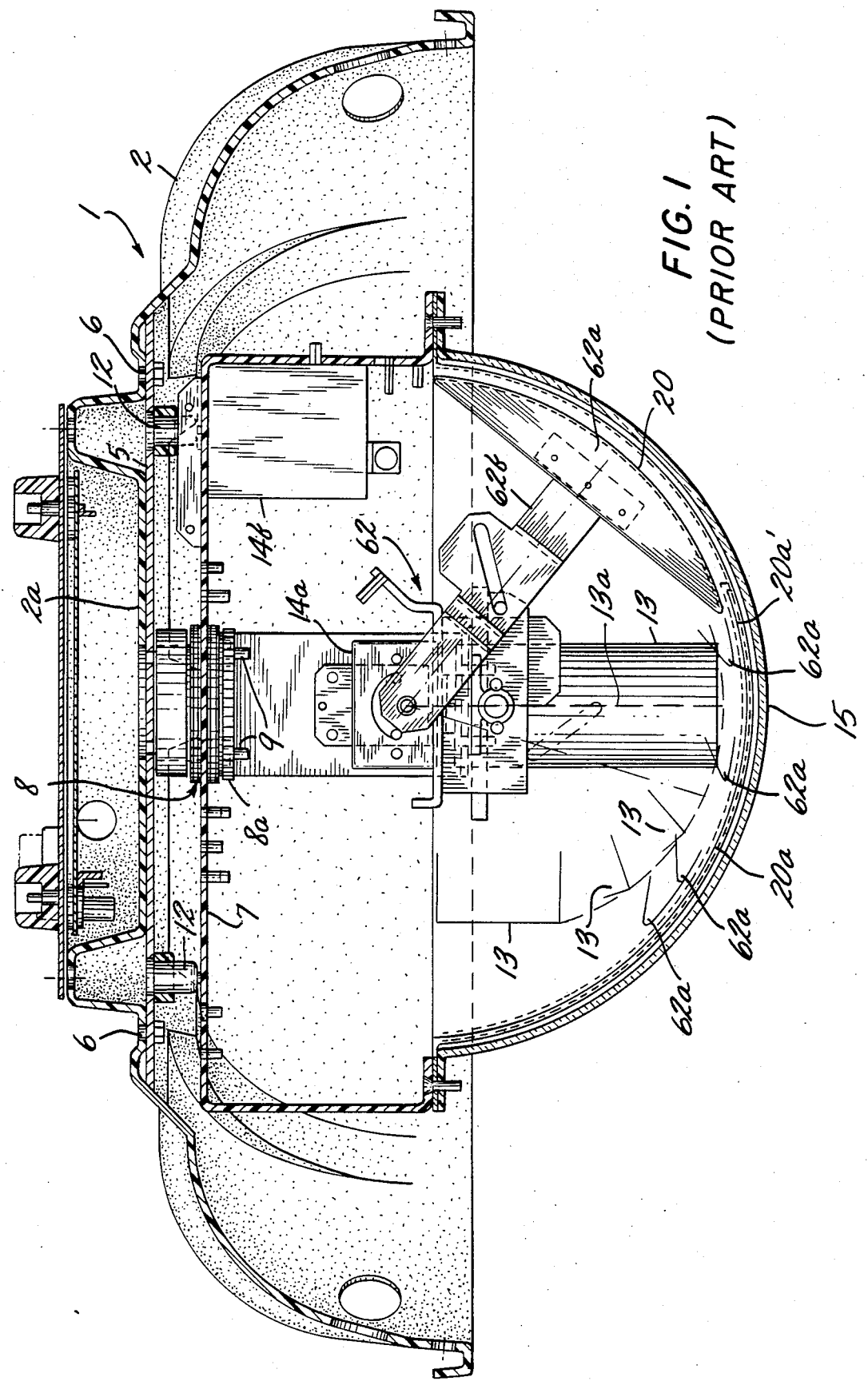
FIG. 1 is a sectional view of the indoor surveillance dome of the above-noted '534 commonly-assigned patent.
Figure 2A:
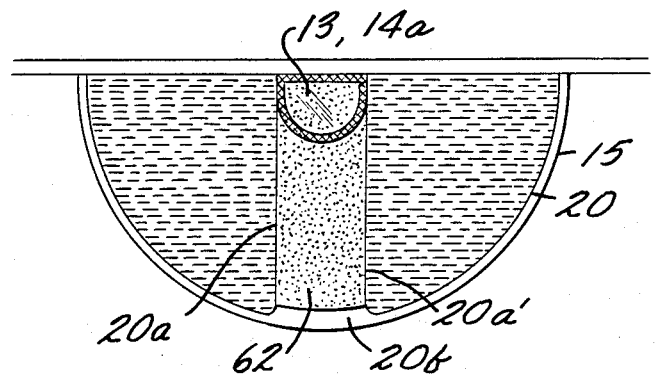
FIGS. 2(a), 2(b) and 2(c) are schematic showings, also from the '534 patent, illustrating tilt camera movement activity therein in common with the subject invention.
Figure 2B:
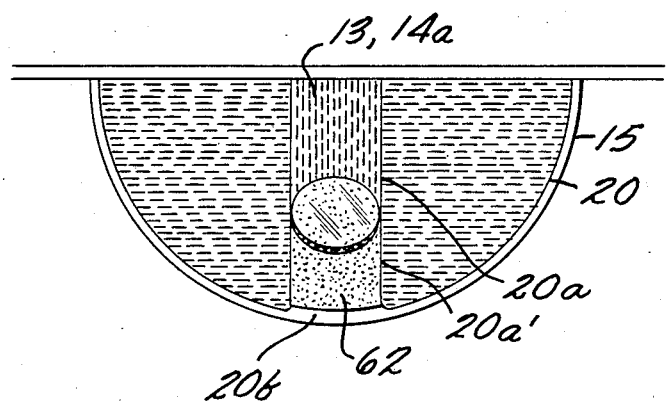
Figure 2C:
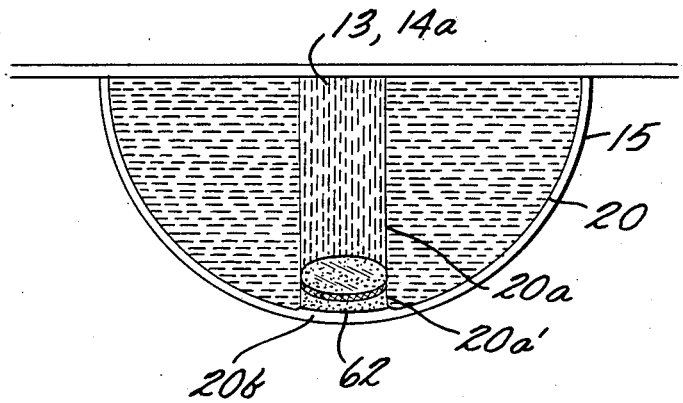

By way of introduction to the present invention, outset reference is now made to the showings of the indoor dome of the '534 patent which are repeated in FIGS. 1-2(c) hereof.

Assembly 1 comprises a shell-like support housing 2 which houses the main components of the assembly. Metal plate 5 is secured to the housing by screws 6 and a further plate 7 is situated below plate 5 and is rotatably mounted to the central area 2a by bearing assembly 8. Assembly 8 is secured to the housing by bolts 9 and associated nuts and carries a fixed gear 8a at its lower end.

Threaded members on plate 7 and corresponding nuts serve to fix a drive or pan motor (all shown in the '534 patent) on plate 7 such that the drive gear of the motor engages fixed gear 8a. Stabilizer bearings 12 mounted to plate 5 are provided to accomodate momentary imbalances in plate 7 during rotation.

The above rotation of plate 7 allows the plate to be rotated three-hundred and sixty degrees about a vertical axis. The viewing direction 13a of assembly 1 accordingly can pan the entire area under surveillance.

Assembly 1 is further provided with a viewing means or lens 13 which defines viewing direction 13a. Lens 13 views the surveillance area along the direction 13a as assembly 1 pans and provides an image of the viewed surveillance area to a camera assembly which converts the image into a video signal.

A dome-like cover 15 transmissive to light encloses the foregoing components of assembly 1 and rotates with plate 7. Interiorly of dome 15 is a further dome-like member or shroud 20 which also rotates with plate 7. Shroud 20 is opaque and provides camouflage for the dome assembly, except for a defined viewing region which is aligned with viewing direction 13a. The viewing region is in the form of a slot 20a in the shroud which runs from the apex 20b of the shroud verically circumferentially through an angle of approximately ninety degrees and horizontally circumferentially through an angle of approximately twenty-five degrees, as is seen in FIGS. 2(a)-2(c). This permits the viewing direction 13a to be pivoted or tilted from a horizontal position to a vertical position (directed downwardly) for each pan position of assembly 1.

The camera assembly comprises a solid state camera in which the solid state image pickup assembly 14a of the camera, i.e., the camera portion which receives the optical image from lens 13, is physically separate from the main body assembly 14b of the camera, i.e., the portion which houses the control electronics for the image pickup as well as the video processing, power and other electronics of camera assembly 14.

Shutter assembly 62 is mounted to assembly 1 in such a way as to closely follow the lens and pickup assemblies 13 and 14a and to be in close proximity to shroud 20 so as to block the slot portion 20a' below the assemblies. Shutter assembly 62 comprises a shutter element 62a which, like the shroud 20 and lens assembly 13, is opaque and which is mounted in alignment with slot 20a by arm 62b.

In the successive tilt positions of FIGS. 2(a)-(c), the joint participation of lens assembly 13 and shutter assembly 62 provides camouflaging for the surveillance practice While the '534 patent structure thus described finds application in that patent to an indoor dome, it is usable, in camera pan, tilt and camouflaging (shroud and shutter) in the present invention, the dome of which is for outdoor application. Accordingly, in the ensuing description, details of the implementation of the pan, tilt and shuttering functions and structure therefor are not further discussed.

Figure 3:
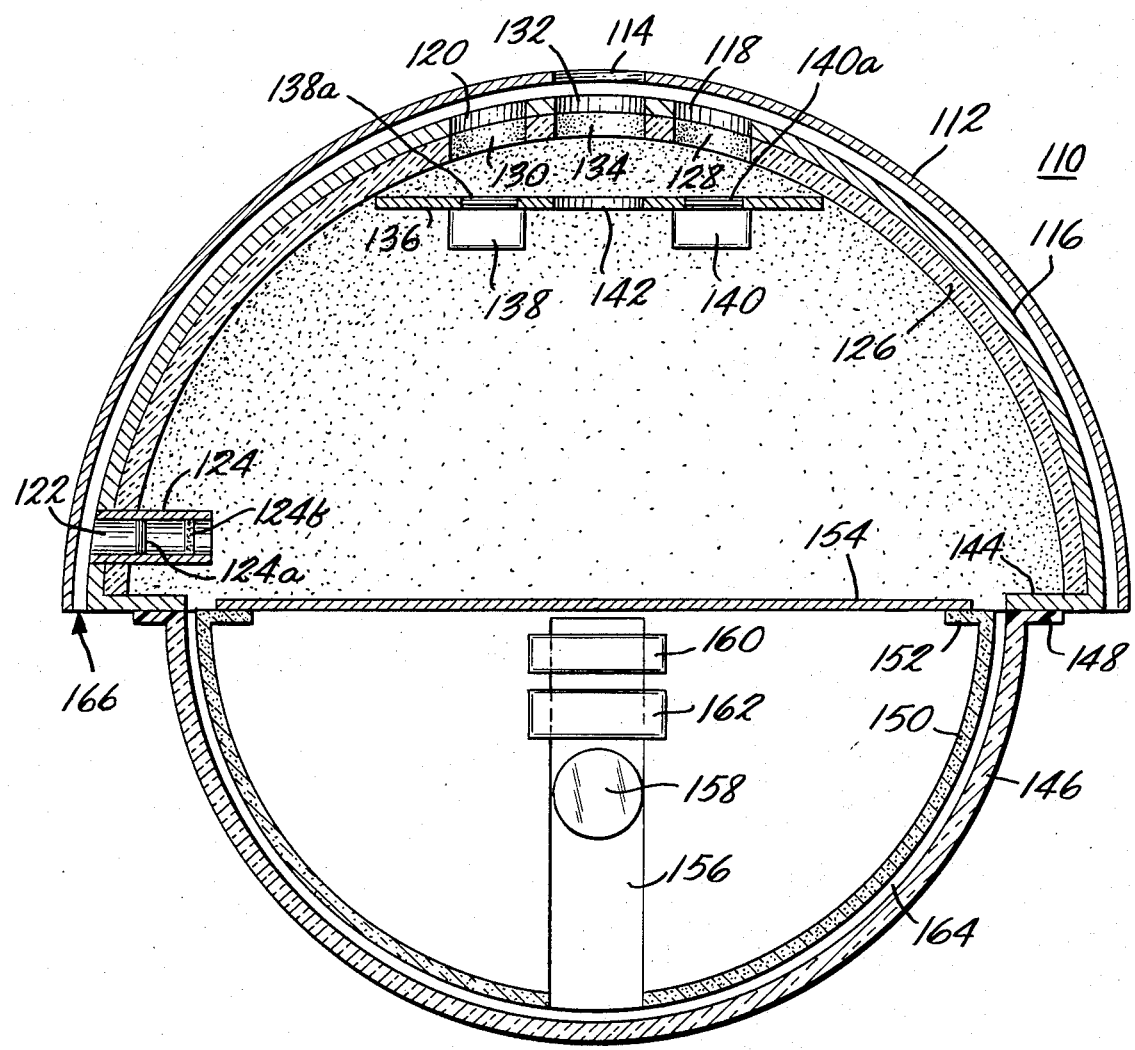
FIG. 3 is a schematic showing of an outdoor surveillance dome in accordance with the subject invention.

Turning now to the schematic showing of FIG. 3, outdoor dome 110 in accordance with the present invention includes sunshield 112 of dome shape and defining a central upper threaded opening 114. Housing 116, preferably comprised of metal, is situated interiorly of sunshield 112 and has upper openings 118 and 120 therein and side, lower opening 122. Intake assembly 124 has one-way valve 124a mounted in registry with opening 122 and filter 124b is in registry with valve 124a. Insulating liner 126 is disposed interiorly of housing 116 and has an opening in registry with opening 122 and upper openings 128 and 130 in registry with housing openings 118 and 120. A further opening 132 is formed in liner 126 in registry with housing opening 134 and sunshield opening 114 concentric about vertical axis 134 with sunshield opening 114. As is discussed below, such opening 132 is normally closed, being formed by cross-shaped slits in liner 126, to be forced open by movement of cabling therethrough, with the liner then sealing upon the cabling.

Support plate 136 is securable to housing 116 and has exhaust fans 138 and 140 secured thereto, one-way valves 138a and 140a being disposed in the issuance paths of fans 138 and 140, respectively. Opening 142 in plate 136 is concentric with vertical axis 134.

Housing 116 further defines inwardly directed flanges 144. Light-transmissive lower dome cover 146 is secured to flanges 144 at its flange 148. Shroud 150 is opaque and has interior flange 152 for securement to plate 154, which rotates by pan motor structure discussed above in connection with the '534 patent. Slot 156 is formed in shroud 150, akin to slot 20a of the '534 patent. Camera pickup 158 is disposed in slot 156 and a shutter element (not shown) corresponding to shutter element 62a of the '534 patent likewise resides in slot 156. Passage 164 exists between shroud 150 and lower dome cover 146 and is in flow communication with slot 156 and with the interior of the dome assembly. Likewise, sunshield 112 and housing 116 define passage 166 therebetween, which is in flow communication with the ambient environment and all of valves 124a, 138a and 140a.

Fan 160 and heater 162 are fixedly supported relative to plate 154 in communication with slot 156 and for rotation with plate 154.

Valves 138a and 140a open when fans 138 and 140 are operative, as above noted, under the influence of the output of the fans. Operation of fans 138 and 140, however, creates negative pressure in the interior of the dome assembly, and valve 124a is negative-pressure-responsive. Accordingly, it opens when fans 138 and 140 operate, and serves as an intake valve, with valves 138a and 140a serving concurrently as outlet valves.

Figure 9:
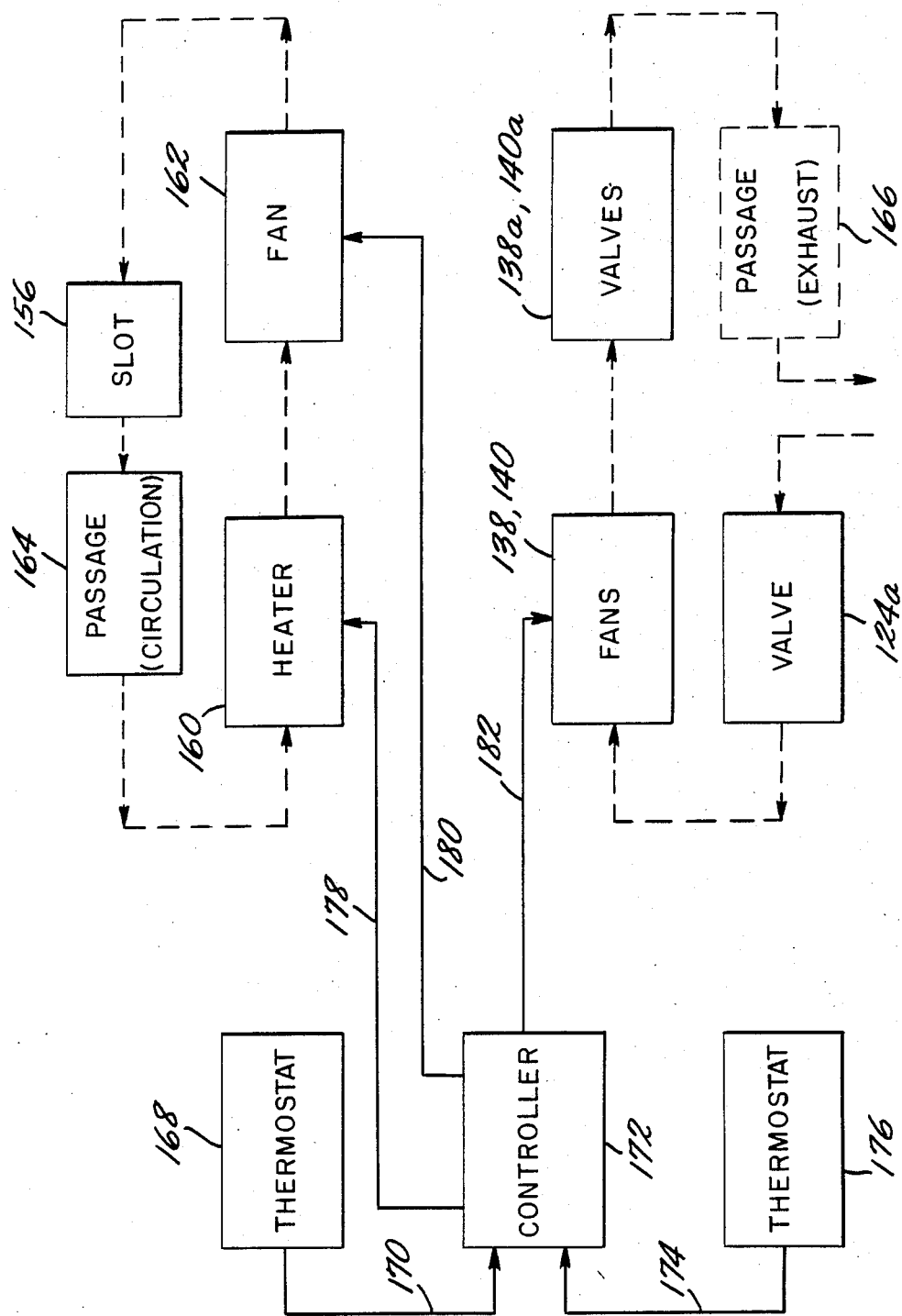
FIG. 9 is a functional block diagram of the system of the invention.

Referring to FIG. 9, the control system of the invention includes a thermostat 168 which is responsive to the detection of a predetermined low temperature within the dome assembly to provide an output signal on line 170 to controller 172. Controller 172 also receives an input signal on line 174 if thermostat 174 detects a predetermined high temperature within the dome assembly.

Controller 172 is responsive to the line 170 input signal (low dome temperature) to activate its output line 178, energizing heater 160. The controller is operative, at all times that the dome assembly is in use, to energize its output line 180, which energizes fan 162 thus on a continuous basis. In this heating mode of operation, the control system furnishes heated air through slot 156 and circulation passage 164 onto the interior surface of lower dome cover 146 to preclude fogging of the same and otherwise preventing moisture condensation therein and in the interior of the dome. In such heating mode, it will be understood that no negative pressure exists within the dome assembly, whereby valve 124a is closed. Valves 138a and 140a are closed since fans 138 and 140 are inoperative. Air flow is indicated in FIG. 9 by the broken lines, solid lines indicating electrical connections.

As above noted, the arrangement of the invention is effective to fully isolate the interior of the apparatus from the environment in the heating mode and to place the same in selective communication with the environment during the cooling mode.

Controller 172 is responsive to the line 174 input signal (high dome temperature) to activate its output line 182, energizing fans 138 and 140. Operation of the fans opens valves 138a and 140a, and creates negative pressure within the dome assembly, opening valve 124a. Ambient air thus flows from the environment through valve 124a, fans 138 and 140, valves 138a and 140a and exhaust passage 166. Since valve 124a occupies only a limited portion of the periphery of passage 166, it will be seen that the air drawn into the dome assembly is largely environmental and quite little is recirculated.

To summarize at this juncture, prior to proceeding to actual structure of the dome assembly, the invention will be seen to provide a control system for adapting an outdoor surveillance apparatus to environmental conditions, the outdoor surveillance apparatus being of the type having first and second dome-shaped housing assemblies joinable to configure the apparatus in generally spherical form, a camera assembly being supported for movement in the second housing assembly The control system comprises a heater supported with the camera assembly for rotational movement therewith, a circulation fan unit supported with the camera assembly also for movement therewith and for issuing output thereof onto the heater, an exhaust fan unit supported in the first housing assembly, thermostat circuitry for generating first and second output signals indicative of respective first and second temperatures in the dome assembly, and a controller for operating the circulation fan unit continuously during use of the apparatus, operating the heater means upon occurrence of the thermostat circuitry first output signal, and operating the exhaust fan unit upon occurrence of the thermostat circuitry second output signal.

Figure 4:
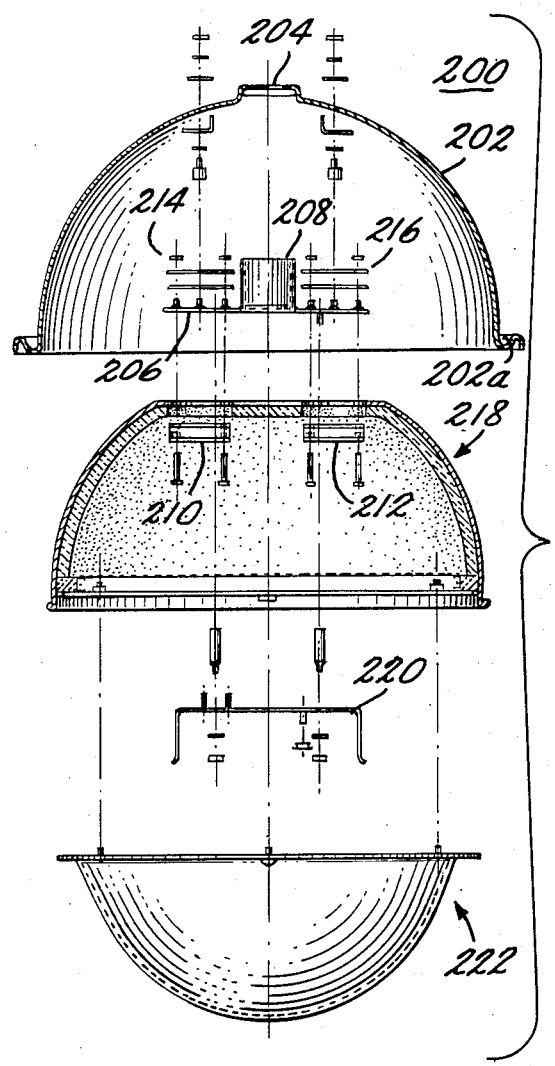
FIG. 4 is an exploded view of components of an actual rendition of an outdoor surveillance dome of the invention.

Turning now to the depiction of a preferred rendition of the apparatus of the invention, FIG. 4 illustrates, in exploded manner, components of the dome assembly, omitting the camera and associated pan and tilt motors and electronics supporting the same, for which incorporating reference is made to the '534 patent and FIGS. 1-2(c) hereof. Dome assembly 200 includes sunshield 202 having central cable and mounting passage 204, adapted by interior threading to receive an exteriorly threaded pipe fixture for supporting the dome, and rain gutter 202a. Exhaust fan support plate 206 has a central cable guide 208 projecting upwardly thereof for disposition in passage 204 and includes various hardware, depicted but not otherwise described, for securement to sunshield 202 and for the securement thereto of fans 210 and 212 and valves 214 and 216. Housing assembly 218 is also thereby secured to sunshield 202, as is camera and shutter support rotational bracket 220. Lower dome assembly 222 is securable also to housing assembly 218.

Figure 5:
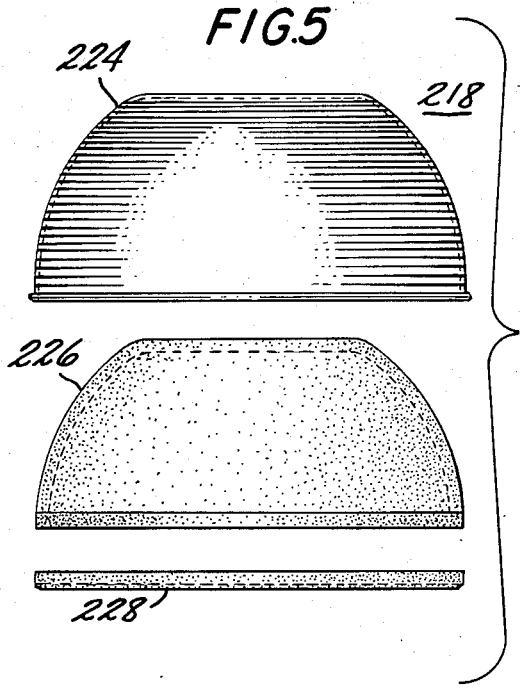
FIG. 5 is an exploded view of components of the spinning assembly of the FIG. 4 dome.
Figure 6:
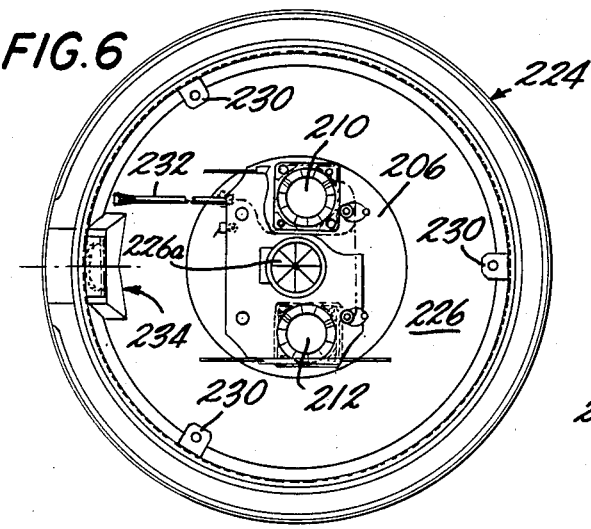
FIG. 6 is a bottom plan view of the upper half of the dome of FIG. 4 with components assembled therein.

Housing assembly 218 is seen in the exploded view of FIG. 5 to include housing 224, liner 226 of insulative material and rubber gasket 228. Liner 226 preferably defines intake valve 124a. housing 224 defines spaced joinder flanges 230 as seen in FIG. 6. Cable 232 energizes fans 210 and 212 and will be understood to correspond to line 182 of the control system of FIG. 9. Intake valve assembly 234 likewise corresponds to valve assembly 124 of FIG. 3. Liner 226 has cross-cuts at 226a, which facilitate sealed passage of cabling therethrough.

Figure 7:
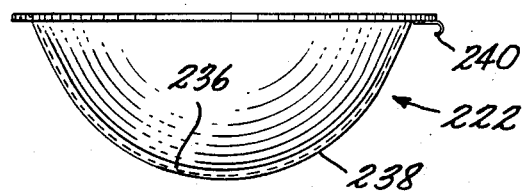
FIG. 7 is a front elevation of the lower half of the dome of FIG. 4.
Figure 8:
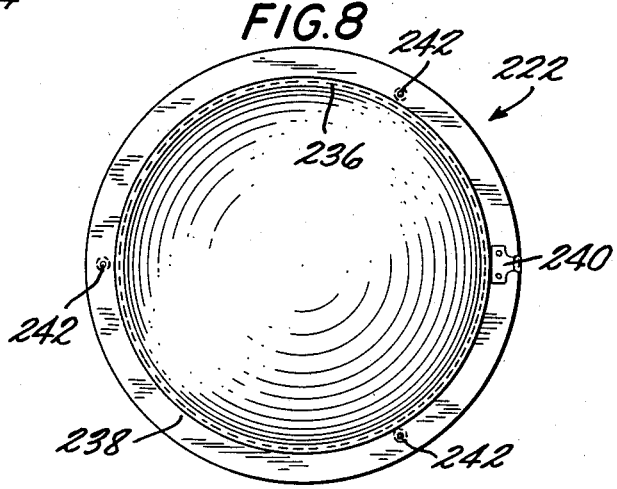
FIG. 8 is a top plan view of the lower half of the dome of FIG. 4.

Turning to FIGS. 7 and 8, lower dome assembly 222 has interior opaque shroud 236 and outer cover 238, which is light transmissive, and includes lanyard 240 for suspending the same from the upper dome assembly as is customary for repair and maintenance. Tamper-resistant screws are placed through openings 242 and threaded into flanges 230 of FIG. 6 to secure the lower dome assembly to the upper dome assembly.

Valves 124a, 138a and 140a preferably are constituted by flappers constrained for flapping movement in only one direction, thereby providing the desired one-way flow activity. Liner 226 is preferably constituted as a foamed heat-insulating material and is perimetrically continuous in its dome shape, with its opening in registry with valve assembly 234 closed by the flapper valve thereof except in the course of operation of fans 210 and 212. Likewise, cross-cut area 226a is self-biasingly closed upon the cabling extending therethrough. Gasket 228 is sealingly disposed between the upper and lower dome assemblies and lower assembly 222 is without any surface openings. Accordingly, heightened thermal isolation is effected for the dome at large from the ambient environment, other than in the cooling mode wherein communication with the environment is desired.

Various changes may evidently be introduced in the foregoing preferred structure and practice without departing from the invention. Accordingly, it need be understood that the particularly disclosed embodiment and method are intended in an illustrative and not in a limiting sense. The true spirit and scope of the invention is set forth in the ensuing claims.

What is claimed is:

1. In combination, in outdoor surveillance apparatus of the type including a camera for viewing a controlled zone:
   (a) thermostat means for generating first or second output signals respectively on sensing of predetermined low and high temperatures in said apparatus;
   (b) first and second fan means operable for movement of mediums respectively contained within said apparatus and from the ambient environment into said apparatus;
   (c) heater means for heating said medium contained within said apparatus and issuing from said first fan means; and
   (d) control means for operating said first fan means continuously during use of said apparatus, for operating said heater means upon occurrence of said first output signal and for operating said second fan means selectively upon occurrence of said second output signal.

2. The invention claimed in claim 1 further including intake valve means operably responsive to negative pressure in said apparatus.

3. The invention claimed in claim 2 further including exhaust valve means supported in the issuance flow path of said second fan means.

4. The invention claimed in claim 1 wherein said camera, said first fan means and said heater means are supported for joint rotative movement.

5. The invention claimed in claim 4 further including shroud means also supported for rotation with said camera, said shroud means defining a slot providing viewability for said camera through said shroud means, said heater means and said first fan means being disposed in registry with said slot.

6. The invention claimed in claim 5 further including intake valve means operably responsive to negative pressure in said apparatus.

7. The invention claimed in claim 6 further including exhaust valve means supported in the issuance flow path of said second fan means.

8. In combination, in an outdoor surveillance apparatus of the type including upper and lower dome-shaped assemblies, supporting therewithin a camera for rotational and tilting movements, said upper assembly including a sunshield and a housing within said sunshield, said lower assembly including a light transmissive outer member and an opaque shroud within said outer member, said shroud including a slot for providing optical communication for said camera therethrough:
   (a) first flow communication passage means between said slot and said lower assembly outer member;
   (b) second flow communication passage means between said sunshield and said housing and open to ambient environment;
   (c) first fan means for flow communication with said first flow communication passage;
   (d) second fan means for flow communication with said second flow communication passage means;
   (e) valve means operable for providing access for said second fan means to said second flow communication passage means for intake of ambient medium to said apparatus and exhaust of said ambient medium to ambient environment;
   (f) heater means in flow communication with said first fan means;
   (g) thermostat means for sensing respective predetermined low and high temperatures in said apparatus; and
   (h) control means for operating said first fan means continuously during use of said apparatus, for operating said second fan means selectively on sensing of said predetermined high temperature, and for operating said heater means selectively upon sensing of said predetermined low temperature.

9. The invention claimed in claim 8 wherein said valve means includes intake valve means operably responsive to negative pressure in said apparatus.

10. The invention claimed in claim 9 wherein said valve means further includes exhaust valve means supported in the issuance flow path of said second fan means.

11. The invention claimed in claim 8 wherein said camera, said first fan means and said heater means are supported for joint rotative movement.

12. The invention claimed in claim 11 wherein said heater means and said first fan means are disposed in registry with said slot.

13. The invention claimed in claim 12 wherein said valve means includes intake valve means operably responsive to negative pressure in said apparatus.

14. The invention claimed in claim 13 wherein said valve means further includes exhaust valve means supported in the issuance flow path of said second fan means.

15. A control system for an outdoor surveillance apparatus of the type including first and second housing assemblies, supporting therewithin a camera for rotational and tilting movements, said control system comprising:
   (a) heater means supported with said camera assembly for movement therewith;
   (b) circulation fan means supported with said camera assembly for issuing output thereof onto said heater means;
   (c) exhaust fan means supported in the first housing assembly;
   (d) thermostat means for generating first and second output signals indicative of respective first and second temperatures in said apparatus; and
   (e) control means for
      (1) operating said circulation fan means continuously during use of said apparatus,
      (2) operating said heater means upon occurrence of said thermostat means first output signal, and
      (3) operating said exhaust fan means upon occurrence of said thermostat means second output signal.

16. The invention claimed in claim 15 wherein said first housing assembly includes intake valve means and exhaust valve means operatively responsive to pressure in said apparatus created by operating of said exhaust fan means to provide for flow communication from the environment respectively into and from said apparatus.

* * * * *